United States Patent
Huh et al.

(10) Patent No.: US 8,498,949 B2
(45) Date of Patent: Jul. 30, 2013

(54) SUPERVISED NONNEGATIVE MATRIX FACTORIZATION

(75) Inventors: Seung-il Huh, Pittsburgh, PA (US); Mithun Das Gupta, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 380 days.

(21) Appl. No.: 12/854,768

(22) Filed: Aug. 11, 2010

(65) Prior Publication Data

US 2012/0041905 A1 Feb. 16, 2012

(51) Int. Cl.
*G06F 15/18* (2006.01)
*G06F 17/16* (2006.01)

(52) U.S. Cl.
USPC ............................................. 706/12; 708/520

(58) Field of Classification Search
None
See application file for complete search history.

(56) References Cited

U.S. PATENT DOCUMENTS

| | | | |
|---|---|---|---|
| 6,584,223 | B1 | 6/2003 | Shiiyama |
| 7,519,200 | B2 | 4/2009 | Gokturk et al. |
| 2003/0041041 | A1 | 2/2003 | Cristianini |
| 2006/0136462 | A1 | 6/2006 | Campos et al. |
| 2008/0291122 | A1 | 11/2008 | Smith et al. |
| 2009/0080666 | A1 | 3/2009 | Uhle et al. |
| 2009/0132901 | A1 | 5/2009 | Zhu et al. |
| 2009/0287624 | A1 | 11/2009 | Rouat et al. |

OTHER PUBLICATIONS

Xu, Yan, Tao, Lin, Zhang, "Marginal Fisher Analysis and its Variants for Human Gait Recognition and Content-Based Image Retrieval", IEEE Transactions on Image Processing, vol. 16, No. 11, Nov. 2007, pp. 2811-2821.*
Sastry, Mohideen, "Modified Algorithm to Compute Pareto-Optimal Vectors", Journal of Optimization, Theory and Applicaitons, Vold 103, No. 1, Oct. 1999, pp. 241-244.*
Wang, Yan, Zhang, Zhang, "Non-negative Semi-supervised Learning", Proceedings of the 12th International Conference on Aritificial Intelligence and Statistics (AISTATS) 2009, Journal of Machine Learning and Research, vol. 5, 2009, pp. 575-582.*
He, "Incremental Semi-supervised Subspace Learning for Image Retrieval," Proceedings of the 12th Annual ACM International Conferene on Multimedia, 2004, pp. 2-8.*
Wang, Yan, Xu, Tang, Huang, "*Trace Ratio* vs. *Ratio Trace for Dimensionality Reduction*," 2007 IEEE Conferernce on Computer Vision and Pattern Recognition, 2007, pp. 1-8.*
Yang, Yang, Fu, Li, Huang, "Non-negative Graph Embedding", IEEE Conference on Computer Vision and Pattern Recognition, 2008, CVPR 2008, pp. 1-8.*
Brunet, J.P., et al., "Metagenes and Molecular Pattern Discovery Using Matrix Factorization", National Academy of Sciences, 102(12): pp. 4164-4169, 2004.
Buciu, I., et al., "Non-negative matrix factorization in polynomial feature space", IEEE Transactions on Neural Networks, 19(6): 2008.
Cai, D., et al., "Non-negative Matrix Factorization on Manifold", ICDM, 2008.

(Continued)

*Primary Examiner* — Kakali Chaki
*Assistant Examiner* — Walter Hanchak

(57) ABSTRACT

Supervised nonnegative matrix factorization (SNMF) generates a descriptive part-based representation of data, based on the concept of nonnegative matrix factorization (NMF) aided by the discriminative concept of graph embedding. An iterative procedure that optimizes suggested formulation based on Pareto optimization is presented. The present formulation removes any dependence on combined optimization schemes. Analytical and empirical evidence is presented to show that SNMF has advantages over popular subspace learning techniques as well as current state-of-the-art techniques.

28 Claims, 7 Drawing Sheets

OTHER PUBLICATIONS

Cooper, Signal M., et al., "Summarizing Video using Non-Negative Similarity Matrix Factorization", IEEE Workshop on Multimedia Signal Processing, pp. 25-28, 2002.

Kim, J., et al., "Toward Faster Nonnegative Matrix Factorization: A New Algorithm and Comparisons", In ICDM, pp. 353-362, 2008.

Sha, F., et al., "Multiplicative Updates for Nonnegative Quadratic Programming in Support Vector Machines", in NIPS, 2003.

Lee, D.D., et al., "Learning the parts of objects by nonnegative matrix factorization", Nature 401: 788-791, 1999.

Lee, D.D., et al., Algorithms for Non-negative Matrix Factorization, NIPS, pp. 556-562, 2000.

Li, S. Z., et al., "Learning Spatially Localized, Parts-Based Representation", in CVPR, pp. 207-212, 2001.

Lin, C.-J., "On the Convergence of Multiplicative Update Algorithms for Non-negative Matrix Factorization", IEEE Transactions on Neural Networks, pp. 1589-1596, 2007.

Lin, C.-J., "Projected gradient methods for non-negative matrix factorization", Neural Computation, 19(10): pp. 2756-2779, 2007.

Wang, C., et al., "Multiplicative Nonnegative Graph Embedding", in CVPR, 2009.

Wang, Y., et al., "Non-Negative Matrix Factorization Framework for Face Recognition", International Journal of Pattern Recognition and Artificial Intelligence, 19(4): 495-511, 2005.

Wang, Y., et al., "Fisher Non-Negative Matrix Factorization for Learning Local Features", in ACCV, 2004.

Xu, Dong, et al., "Marginal Fisher Analysis and its Variants for Human Gait Recognition and Content-Based Image Retrieval", IEEE Trans. on Image Processing, 16(11), 2007.

Xu, W., et al., "Document Clustering Based on Non-negative Matrix Factorization", SIGIR, ACM Conference, pp. 267-273, 2003.

Yang, J., et al., "Non-Negative Graph Embedding", in CVPR 2008.

Zafeiriou, S., et al., "Nonlinear Nonnegative Component Analysis", CVPR, pp. 2860-2865, 2009.

Duda, R., et al., "Pattern Classification, Second Edition, pp. 215-281, Linear Discriminant Functions", 2006.

* cited by examiner

TABLE 1

| Algorithm | FERET | JAFFE |
|---|---|---|
| PCA | 79.33 ± 3.40 | 63.65 ± 3.98 |
| ICA | 83.86 ± 3.57 | 66.35 ± 3.24 |
| NMF | 87.76 ± 3.09 | 64.92 ± 3.85 |
| LNMF | 84.24 ± 3.50 | 66.51 ± 5.04 |
| LDA | 90.76 ± 3.15 | 72.70 ± 4.86 |
| MFA | 84.57 ± 5.25 | 72.38 ± 5.51 |
| NGE | 87.14 ± 3.30 | 68.25 ± 4.81 |
| SNMF | 91.48 ± 2.90 | 74.60 ± 5.22 |

Face recognition accuracies (%) of several approaches on FERET and JAFFE databases.

| Algorithm | Accuracy | Algorithm | Accuracy |
|---|---|---|---|
| PCA | 17.53 ± 0.87 | LDA | 48.16 ± 1.68 |
| ICA | 68.84 ± 1.67 | MFA | 72.17 ± 1.97 |
| NMF | 66.01 ± 1.33 | NGE | 49.58 ± 1.71 |
| LNMF | 55.14 ± 2.07 | SNMF | 73.52 ± 1.58 |

TABLE 2

SUPERVISED NONNEGATIVE MATRIX FACTORIZATION

CROSS-REFERENCE TO RELATED APPLICATIONS

This application is related to U.S. patent application Ser. No. 12/854,781 entitled "Supervised Nonnegative Matrix Factorization" filed on the same day as the instant application, and U.S. patent application Ser. No. 12/854,776 entitled "Supervised Nonnegative Matrix Factorization" filed on the same day as the instant application. These related applications are hereby incorporated by reference for all purposes.

FIELD OF INVENTION

The present invention relates to the field of matrix factorization. More specifically, it relates to the field of matrix factorization with incorporated data classification properties.

DESCRIPTION OF RELATED ART

Nonnegative matrix factorization (NMF) has recently been used for various applications, such as face recognition, multimedia, text mining, and gene expression discovery. NMF is a part-based representation wherein nonnegative inputs are represented by additive combinations of nonnegative bases. The inherent normegativity constraint in NMF leads to improved physical interpretation compared to other factorization methods, such as Principal Component Analysis (PCA). Psychological and physiological evidence for part-based representations in the brain appear to support the advantage of NMF.

Interestingly, NMF does not explain the recognition capability of the brain since NMF and its variants have been designed not for classification but for reconstruction. The lack of classification capability is a natural consequence of the unsupervised factorization method that does not utilize relationships within the input entities, such as class labels.

Several approaches have been proposed for NMF to generate more descriptive features for classification and clustering tasks. For example, "Fisher Nonnegative Matrix Factorization", ACCV, 2004, by Y. Wang, Y. Jiar, C. Hu, and M. Turk, proposes incorporating the NMF cost function and the difference of the between-class scatter from the within-class scatter. However, the objective of this Fisher-NMF is not guaranteed to converge since it may not be a convex function. "Non-negative Matrix Factorization on Manifold", ICDM, 2008, by D. Cai, X. He, X. Wu, and J. Han proposes graph regularized NMF (GNMF), which appends the term representing the favorite relationships among feature vector pairs. But, GNMF is handicapped by not considering unfavorable relationships.

Recently, J. Yang, S. Yang, Y. Fu, X. Li, and T. Huang proposed "Non-negative graph embedding" (NGE), in CVPR, 2008. NGE resolved the previous problems by introducing the concept of complementary space so as to be widely considered the state-of-the-art. NGE, however, utilized the approximate formulation of graph embedding, and as a result, NGE is not effective enough for classification, particularly when intra-class variations are large. This limitation is highlighted in experimental results shown below.

In a general sense, all of these previous works tried to incorporate NMF with graph embedding, but none of them successfully adopted the original formulation of graph embedding because the incorporated optimization problem is intractable. In addition, all the works are limited in that they depend on suitable parameters which are not easy to be determined appropriately.

SUMMARY OF INVENTION

It is an object of the present invention to incorporate NMF with graph embedding using the original formulation of graph embedding.

It is another object of the present invention to permit the use of negative values in the definition of graph embedding without violating the requirement of NMF to limit itself to nonnegative values.

The above objects are met in a matrix factorization method, a method for applying the factorization method to test data classification, and a system for classifying test data using the matrix factorization method.

A preferred embodiment of the present invention is a method of factorizing a data matrix U file by supervised nonnegative factorization, SNMF, consisting of: providing a data processing device to implement the following step: accessing the data matrix U from a data store, wherein data matrix U is defined as $U \in \mathbb{R}^{d \times n}$; defining an intrinsic graph G, wherein G={U, W}, each column of $U \in \mathbb{R}^{d \times n}$ represents a vertex, and each element of similarity matrix W measures the similarity between vertex pairs; defining a penalty graph $\overline{G}$, wherein $\overline{G}=\{U, \overline{W}\}$ and each element of dissimilarity matrix $\overline{W}$ measures unfavorable relationships between the vertex pairs; defining an intrinsic diagonal matrix D, wherein $D=[D_{ij}]$ and $D_{ii}=\Sigma_{j=1}^{n}W_{ij}$; defining an intrinsic Laplacian matrix L, wherein L=D−W; defining a penalty diagonal matrix $\overline{D}$, wherein $\overline{D}=[\overline{D}_{ij}]$ and $\overline{D}_{ii}=\Sigma_{j=1}^{n}\overline{W}_{ij}$; defining a penalty Laplacian matrix $\overline{L}$, wherein $\overline{L}=\overline{D}-\overline{W}$; defining a basis matrix V, where $V \in \mathbb{R}^{d \times r}$; defining a feature matrix X, where $X \in \mathbb{R}^{r \times n}$; defining a measure of the compactness of intrinsic graph G by the weighted sum of squared distances defined as $\Sigma_{i<j}^{n}W_{ij}\|x_i-x_j\|^2=\mathrm{Tr}(XLX^T)$, wherein $x_i$ is the i-th column of X and $x_j$ is the j-th column of X; defining a measure of the separability of penalty graph $\overline{G}$ by the weighted sum of squared distances defined as $\Sigma_{i<j}^{n}\overline{W}_{ij}\|x_i-x_j\|^2=\mathrm{Tr}(X\overline{L}X^T)$, wherein $x_i$ is the i-th column of X and $x_j$ is j-th column of X; defining $F^{(1)}(V, X)$ as an objective of NMF (nonnegative matrix factorization), wherein as $F^{(1)}(V, X)=\|U-VX\|_F^2$; defining $F^{(2)}(X)$ as an objective of graph embedding, where $$F^{(2)}(X) = \frac{\mathrm{Tr}(XLX^T)}{\mathrm{Tr}(X\overline{L}X^T)};$$

applying Pareto optimality to $F^{(1)}(V, X)$ and $F^{(2)}(X)$; and defining the final state V*, X* of matrices V and X at the Pareto optimal resulting from application of the Pareto optimality as a factorization of data matrix U.

Preferably, data matrix U is comprised of n samples and each column of U represents a sample. Optionally, each of the samples may be an image file.

Also in this method, W and $\overline{W}$ are generated from true relationships among data pairs. Theses data pairs may be class labels of data.

This method defines each column of feature matrix X as a low dimensional representation of the corresponding column of matrix U.

Preferably, the ratio formation of $F^{(2)}(X)$ is handled without any transformation. Additionally, at least one of similarity matrix W or dissimilarity matrix $\overline{W}$ has negative values. It may be noted, however, that $Tr(XLX^T)$ and $Tr(X\overline{L}X^T)$ are positive.

In this method, the Pareto optimality is applied directly on the ratio formulation of $F^{(2)}(X)$ in the absence of any weighed sum approximation.

Preferably, the Pareto optimality is applied through a series of Pareto improvement status update iterations defined as a change from a current status (V, X) to a new status (V', X') that achieves a Pareto improvement until the Pareto optimal is achieved. A status update is a Pareto improvement if either of the following two conditions is satisfied:

$$F^{(1)}(V',X') < F^{(1)}(V,X)$$

and $$F^{(2)}(V',X') \leq F^{(2)}(V,X) \quad 1)$$

$$F^{(1)}(V',X') \leq F^{(1)}(V,X)$$

and $$F^{(2)}(V',X') < F^{(2)}(V,X) \quad 2)$$

Additionally, a current status is a Pareto optimal (V*, X*) if there is no other status (V', X') such that a status update iteration from (V*, X*) to (V', X') is a Pareto improvement.

In a more specific implementation of this method, the Pareto optimality is applied to $F^{(1)}(V, X)$ and to $F^{(2)}(X)$ through iteratively multiplicative updates until the Pareto optimal is achieved. This is done by letting $\lambda = F^{(2)}(X)$; letting $$T_{ij}^{(1)} = \frac{(V^T U)_{ij}}{(V^T V X)_{ij}};$$

letting $$T_{ij}^{(2)} = \frac{(X(L - \lambda \overline{L})^-)_{ij}}{(X(L - \lambda \overline{L})^+)_{ij}};$$

letting matrix $(L - \lambda \overline{L})^+$ be defined as $(L - \lambda \overline{L})^+ = A^+ = [A_{ij}^+]$ and $$A_{ij}^+ = \begin{cases} A_{ij} & \text{if } A_{ij} > 0 \\ 0 & \text{otherwise;} \end{cases}$$

and letting matrix $(L - \lambda \overline{L})^-$ be defined as $(L - \lambda \overline{L})^- = A^- = [A_{ij}^-]$ and $$A_{ij}^- = \begin{cases} -A_{ij} & \text{if } A_{ij} < 0 \\ 0 & \text{otherwise.} \end{cases}$$

Under these conditions, the multiplicative updates are:

$$V_{ij} \leftarrow V_{ij} \frac{(UX^T)_{ij}}{(VXX^T)_{ij}}$$

and $X_{ij} \leftarrow X_{ij} \cdot h(T_{ij}^{(1)}, T_{ij}^{(2)})$, where $$h(a, b) = \begin{cases} \min(a, b) & \text{if } a > 1 \text{ and } b > 1 \\ \max(a, b) & \text{if } a < 1 \text{ and } b < 1 \\ 1 & \text{otherwise.} \end{cases}$$

The Pareto optimal is then achieved when the multiplicative updates reach a stationary point.

In this method, the similarity matrix W and dissimilarity matrix $\overline{W}$ may be defined by the concept of within-class and between-class distances of Linear Discriminant Analysis (LDA). In this case, similarity matrix $W = [W_{ij}]$ is defined as:

$$W_{ij} = \begin{cases} \frac{1}{n_c} & \text{if } y_i, y_j \in c \\ 0 & \text{otherwise} \end{cases}$$

wherein $y_i$ is a class label of the i-th sample, $y_j$ is a class label of the j-th sample, and $n_c$ is the size of class c. Similarly, dissimilarity matrix $\overline{W} = [\overline{W}_{ij}]$ is defined as $$\overline{W}_{ij} = \frac{1}{n} - W_{ij}$$

wherein n is the total number of data points.

This method may be applied to a method of classifying test data, comprising: arranging a set of training data into a data matrix U; applying the above-described supervised nonnegative factorization method to data matrix U to identify the Pareto optimal state V* and X* of factorizing matrices V and X at the Pareto optimal; and classifying the test data according only to the classification defined by X*.

The present objects are also met in a data classification system for classifying test data, comprising: a data processing device with access to a data matrix U of training data and with access to the test data, the data matrix U being defined as $U \in \mathbb{R}^{d \times n}$; wherein an intrinsic graph G is defined as $G = \{U, W\}$, each column of $U \in \mathbb{R}^{d \times n}$ representing a vertex and each element of similarity matrix W measuring the similarity between vertex pairs; a penalty graph $\overline{G}$ is defined as $\overline{G} = \{U, \overline{W}\}$ and each element of dissimilarity matrix $\overline{W}$ measures unfavorable relationships between the vertex pairs; an intrinsic diagonal matrix D is defined as $D = [D_{ij}]$ and $D_{ii} = \Sigma_{j=1}^n W_{ij}$; an intrinsic Laplacian matrix L is defined as $L = D - W$; a penalty diagonal matrix $\overline{D}$ is defined as $\overline{D} = [\overline{D}_{ij}]$ and $\overline{D}_{ii} = \Sigma_{j=1}^n \overline{W}_{ij}$; a penalty Laplacian matrix $\overline{L}$ is defined as $\overline{L} = \overline{D} - \overline{W}$; a basis matrix V is defined as $V \in \mathbb{R}^{d \times r}$, a feature matrix X is defined as $X \in \mathbb{R}^{r \times n}$; a measure of the compactness of intrinsic graph G is defined by the weighted sum of squared distances defined as $\Sigma_{i<j}^n W_{ij} \|x_i - x_j\|^2 = Tr(XLX^T)$, wherein $x_i$ is the i-th column of X and $x_j$ is the j-th column of X.

In this system, a measure of the separability of penalty graph $\overline{G}$ is defined by the weighted sum of squared distances defined as $\Sigma_{i<j}^n \overline{W}_{ij} \|x_i - x_j\|^2 = Tr(X\overline{L}X^T)$, wherein $x_i$ is the i-th column of X and $x_j$ is j-th column of X; $F^{(1)}(V, X)$ defines an objective of NMF (nonnegative matrix factorization), wherein as $F^{(1)}(V, X) = \|U - VX\|_F^2$; $F^{(2)}(X)$ defines an objective of graph embedding, where $$F^{(2)}(X) = \frac{Tr(XLX^T)}{Tr(X\overline{L}X^T)};$$

and the data processing device applies Pareto optimality to $F^{(1)}(V, X)$ and $F^{(2)}(X)$, defines the final state $V^*$, $X^*$ of matrices V and X at the Pareto optimal resulting from application of the Pareto optimality as a factorization of data matrix U, and classifies the test data according to only the classification defined by $X^*$.

Preferably data matrix U is comprised of n samples and each column of U represents a sample. Each of the samples may be an image file. Also, the data pairs are preferably class labels of data.

Further preferably, each column of feature matrix X is a low dimensional representation of the corresponding column of U.

Additionally, the ratio formation of $F^{(2)}(X)$ may be handled without any transformation. It is further noted that at least one of similarity matrix W or dissimilarlty matrix $\overline{W}$ may have negative values, and the Pareto optimality may be applied directly on the ratio formulation of $F^{(2)}(X)$ in the absence of any weighed sum approximation.

Preferably, the Pareto optimality is applied through a series of Pareto improvement status update iterations defined as a change from a current status (V, X) to a new status (V', X') that achieves a Pareto improvement until the Pareto optimal is achieved, and a status update is a Pareto improvement if either of the following two conditions is satisfied:

$F^{(1)}(V',X') < F^{(1)}(V,X)$ and $F^{(2)}(V',X') \leq F^{(2)}(V,X)$     1)

$F^{(1)}(V',X') \leq F^{(1)}(V,X)$ and $F^{(2)}(V',X') < F^{(2)}(V,X)$     2)

and a current status is a Pareto optimal $(V^*, X^*)$ if there is no other status (V', X') such that a status update iteration from $(V^*, X^*)$ to (V', X') is a Pareto improvement.

In a more specific example, Pareto optimality is applied to $F^{(1)}(V, X)$ and to $F^{(2)}(X)$ through iteratively multiplicative updates until the Pareto optimal is achieved. This is achieved by first letting $\lambda = F^{(2)}(X)$; letting $$T_{ij}^{(1)} = \frac{(V^T U)_{ij}}{(V^T V X)_{ij}};$$

letting $$T_{ij}^{(2)} = \frac{(X(L - \lambda \overline{L})^-)_{ij}}{(X(L - \lambda \overline{L})^+)_{ij}};$$

letting matrix $(L - \lambda \overline{L})^+$ be defined as $(L - \lambda \overline{L})^+ = A^+ = [A_{ij}^+]$ and $$A_{ij}^+ = \begin{cases} A_{ij} & \text{if } A_{ij} > 0 \\ 0 & \text{otherwise;} \end{cases}$$

letting matrix $(L - \lambda \overline{L})^-$ be defined as $(L - \lambda \overline{L})^- = A^- = [A_{ij}^-]$ and $$A_{ij}^- = \begin{cases} -A_{ij} & \text{if } A_{ij} < 0 \\ 0 & \text{otherwise.} \end{cases}$$

The multiplicative updates may then be defined as:

$$V_{ij} \leftarrow V_{ij} \frac{(UX^T)_{ij}}{(VXX^T)_{ij}}$$

and $X_{ij} \leftarrow X_{ij} \cdot h(T_{ij}^{(1)}, T_{ij}^{(2)})$, where $$h(a, b) = \begin{cases} \min(a, b) & \text{if } a > 1 \text{ and } b > 1 \\ \max(a, b) & \text{if } a < 1 \text{ and } b < 1 \\ 1 & \text{otherwise.} \end{cases}$$

In this case, the Pareto optimal is achieved when the multiplicative updates reach a stationary point.

Also in this system, similarity matrix $W = [W_{ij}]$ is defined as:

$$W_{ij} = \begin{cases} \frac{1}{n_c} & \text{if } y_i, y_j \in c \\ 0 & \text{otherwise} \end{cases}$$

wherein $y_i$ is a class label of the i-th sample, $y_j$ is a class label of the j-th sample, and $n_c$ is the size of class c; and dissimilarity matrix $\overline{W} = [\overline{W}_{ij}]$ is defined as $$\overline{W}_{ij} = \frac{1}{n} - W_{ij}$$

wherein n is the total number of data points.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Recently, Nonnegative Matrix Factorization (NMF) has received much attention due to its representative power for nonnegative data. The discriminative power of NMF, however, is limited by its inability to consider relationships present in data, such as class labels. Several works tried to address this issue by adopting the concept of graph embedding, albeit in an approximated form. In this paper, we propose Supervised NMF (SNMF) that incorporates the objective function of graph embedding without any approximations, which was previously deemed to be intractable. We present a novel way of considering the objective functions of NMF and graph embedding separately and finding a Pareto optimum through iteratively searching for Pareto improvements. As a result, SNMF achieves higher classification performance since it does not compromise the full potential of graph embedding. Furthermore, SNMF is designed for computational efficiency, no parameter tuning, formulation flexibility, and applicability to NMF variants. Empirical evidence demonstrates the success of SNMF in terms of robustness to variations as well as recognition accuracy compared to state-of-the-art techniques.

The present work proposes an approach herein named supervised nonnegative matrix factorization (SNMF), which is intended to achieve classification capability based on the benefits of the part-based representation of NMF. First of all, SNMF adopts the original formulation of graph embedding and solves a system of optimization problems through iteratively searching for a Pareto improvement. Generally, Pareto optimization is a concept in economics and game theory, but is herein applied to more effectively incorporate graph imbedding concepts to NMF.

Due to the effectiveness of the original formulation, SNMF shows better performance than previous works for classification. Aside from the classification power, SNMF is designed to have several advantages over previous works, including computational efficiency, no parameter tuning, formulation flexibility, and applicability to NMF variants. SNMF also outperforms other subspace learning methods in terms of recognition accuracy and robustness to variations, especially when intra-class variations are not trivial.

Figure 1:
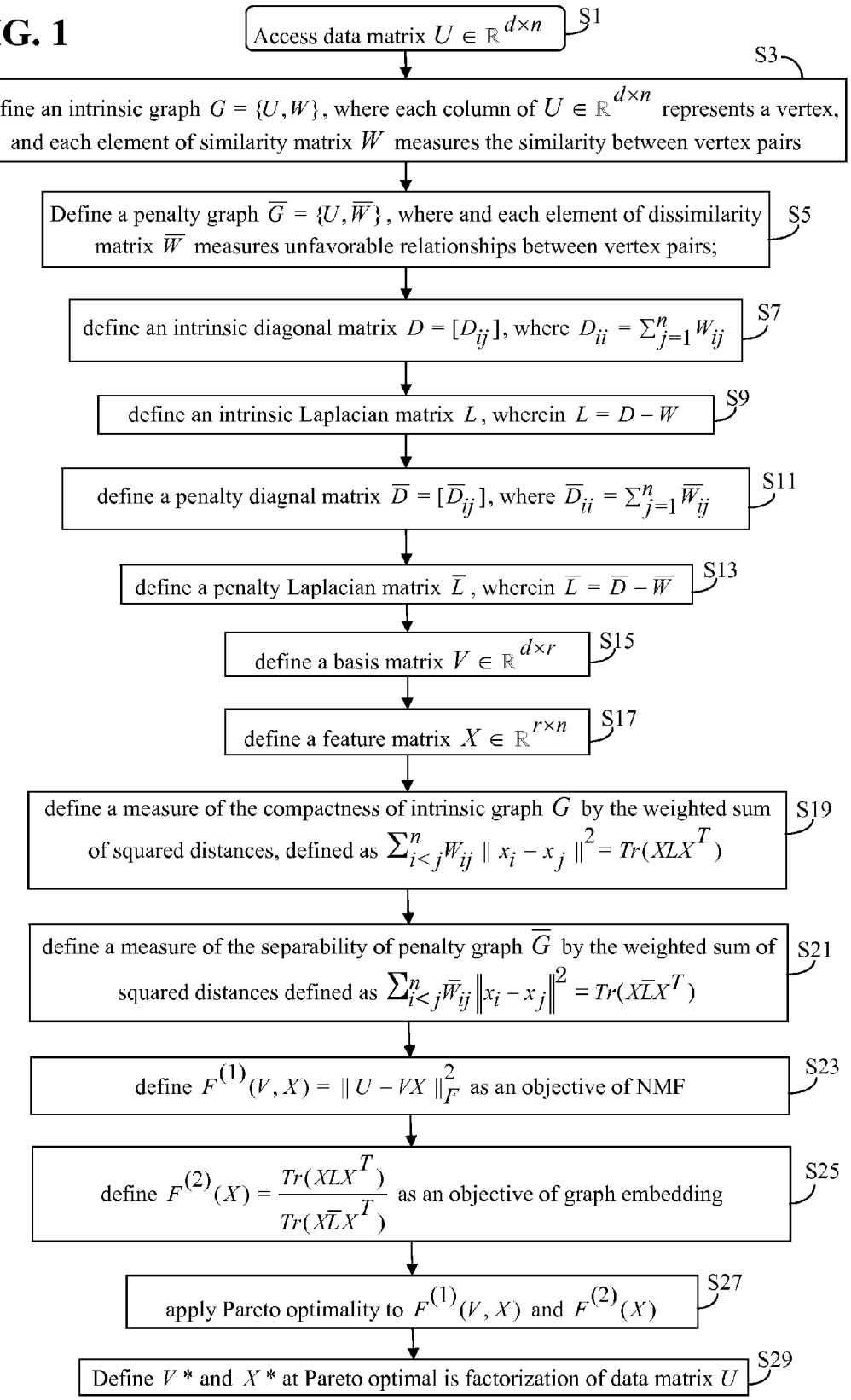
FIG. 1 is a flowchart of a preferred SNMF method in accord with the present invention.

With reference to FIG. 1, SNMF combines the benefits of non-negative matrix factorization (NMF) and graph embedding, each of which is discussed in turn.

Before describing SNMF, it is beneficial to first provide background information regarding non-negative matrix factorization (NMF) and graph embedding. For completeness, a briefly introduce to non-negative graph embedding (NGE) is also provided since it is currently considered a state-of-the-art approach.

Like NMF, SNMF factorizes a matrix U into the product of two, preferably smaller matrices: a basis matrix V (where $V \in \mathbb{R}^{d \times r}$) and a coefficient matrix (or feature matrix) X (where $X \in \mathbb{R}^{r \times n}$). For example, matrix U may be a raw data matrix of n samples (or data points) with each sample being of dimension d such that $U \in \mathbb{R}^{d \times n}$ (step S1). A specific example of this may be if each of the n columns of U (i.e. each of the n samples) is an image of size d. Matrix U is factorized into the product of basis matrix V and a feature matrix X by minimizing the following reconstruction error:

$$\min_{V,X} \|U - VX\|_F^2 \text{ s.t. } V_{ik} \geq 0 \text{ and } X_{kj} \geq 0 \; \forall \; i, j, \text{ and } k \qquad (1)$$

Where $\|\cdot\|_F$ denotes the Frobenius norm. Since Eq. (1) is not a convex function of both V and X, there is no closed form solution for the global optimum. Thus, many researchers have developed iterative update methods to solve the problem. Among them, a popular approach is the multiplicative updates devised by Lee and Seung in "Learning the parts of objects by non-negative matrix factorization", Nature, 401: 788-791, 1999, which is hereby incorporated in its entirety by reference. These multiplicative updates, shown below as equation (2), $$V_{ij} \leftarrow V_{ij} \frac{(UX^T)_{ij}}{(VXX^T)_{ij}}, \quad X_{ij} \leftarrow X_{ij} \frac{(V^TU)_{ij}}{(V^TVX)_{ij}} \qquad (2)$$

are popular due to their simplicity. These updates monotonically decrease the objective function in Eq. (1).

Graph embedding, on the other hand, may be defined as the optimal low dimensional representation that best characterizes the similarity relationships between data pairs. In graph embedding, dimensionality reduction involves two graphs: an intrinsic graph that characterizes the favorable relationships among feature vector pairs and a penalty graph that characterizes the unfavorable relationships among feature vector pairs. Thus, applying graph embedding to data matrix U would organize its raw data into classes according to specified favorable and unfavorable relationships. To achieve this, however, one first needs to define graph embedding as applied to data matrix U.

For graph embedding, one lets G={U,W} be an intrinsic graph where each column of $U \in \mathbb{R}^{d \times n}$ represents a vertex and each element of W measures the similarity between vertex pairs (step S3). In the same way, a penalty graph $\overline{G}$, which measures the unfavorable relationships between vertex pairs may be defined as $\overline{G}=\{U,\overline{W}\}$ (step S5). In this case, W and $\overline{W}$ can be generated from true relationships among data pairs, such as class labels of data. In addition, the diagonal matrix $D=[D_{ij}]$ is defined, where $D_{ii}=\Sigma_{j=1}^{n}W_{ij}$ (step S7) and the Laplacian matrix L=D−W is defined (step S9). Matrices $\overline{D}$ and $\overline{L}$ are defined from $\overline{W}$ in the same way (steps S11 and S13).

As is explained above, to factorize data matrix U, which is defined as $U \in \mathbb{R}^{d \times n}$, one defines a basis matrix V such that $V \in \mathbb{R}^{d \times r}$ (step S15), defines a feature matrix X such that $X \in \mathbb{R}^{r \times n}$ (step S17), and seeks to populate V and X such that the product of V and X approximates U with minimal error. An object of the present invention, however, is to combine graph embedding with the factorization of matrix U such that the classification properties of graph embedding are incorporated into factorized basis matrix V and a feature matrix X. The present embodiment achieves this by defining the objective of graph embedding in terms of feature matrix X.

First, let each column of feature matrix X be a low dimensional representation of the corresponding column of U. Then, one can measure the compactness of the intrinsic graph G and the separability of the penalty graph $\overline{G}$ by the weighted sum of squared distances of feature matrix X, as follows:

$$\Sigma_{i<j}{}^n W_{ij}\|x_i-x_j\|^2 = Tr(XLX^T) \quad \text{(Step S19)}$$

$$\Sigma_{i<j}{}^n \overline{W}_{ij}\|x_i-x_j\|^2 = Tr(X\overline{L}X^T) \quad \text{(Step S21)}$$

where $x_i$ is the i-th column of X and $x_j$ is j-th column of X.

The objective of graph embedding, as is the case of most dimensionality reduction methods, can be generalized to the following unified framework with specifically defined W and $\overline{W}$.

$$\min \frac{Tr(XLX^T)}{Tr(X\overline{L}X^T)} \quad (5)$$

As an aside, and before continuing with the discussion of the presently preferred embodiment, it may be useful to address how the prior work of Nonnegative Graph Embedding (NGE) attempts to combine the NMF objective and the graph embedding objective to achieve both the benefits. First, it must be noted that NGE does not adopt the original graph embedding objective of Eq. (5) because it makes NGE's unified optimization problem intractable. Instead, NGE adopts the following transformed formulation.

Suppose that feature matrix X and basis matrix V are divided into two parts as $$X = \begin{bmatrix} X_1 \\ X_2 \end{bmatrix}$$

and $V=[V_1 V_2]$. Here, NGE considers $(X_2,V_2)$ the complementary space of $(X_1, V_1)$. Then NGE minimizes $$\min_{V,X} Tr(Q_1 X_1 L X_1^T Q_1^T) + Tr(Q_2 X_2 \overline{L} X_2^T Q_2^T) + \lambda \|U - VX\|_F^2 \quad (6)$$

s.t. $V \geq 0$ and $X \geq 0$ where $Q_1$ and $Q_2$ are diagonal matrices that consist of the norms of basis vectors in $V_1$ and $V_2$, respectively. These two matrices are multiplied to compensate the norms of bases into coefficient matrices.

Yang et al. argued that NGE minimizes the penalty graph term rather than maximizing it due to the complementary property between $(X_1, V_1)$ and $(X_2, V_2)$. However, it is doubtful whether the complementary space exists without violating the nonnegative constraints. Even if the space exists, NGE provides no assurance that it can discover the complementary space. In fact, experimental results, detailed below, show that NGE does not sufficiently maximize separability of the penalty graph.

Returning now to the subject of the present invention: supervised nonnegative matrix factorization (SNMF). The mathematical details of the presently proposed approach of SNMF are first formalized. It is put forth that the present method generates more descriptive features based on the part-based representation of NMF and has several advantages over previous works that were based on a similar idea to that of SNMF. The experimental results, shown below, substantiate this claim.

To acquire both the benefits of part-based representation and the classification power of graph embedding, the present invention addresses both the objectives of NMF and the objective of graph embedding. However, unlike previous works, the present invention directly handles the ratio formation of graph embedding without any transformation.

Although it was previously believed that the ratio formulation of graph embedding made its use in NMF intractable, the present approach makes the problem manageable by taking into account the two objectives separately, rather than attempting to manage the weighted sum of them, as is generally proposed in previous works. The two objectives that are considered are:

$$F^{(1)}(V,X) = \|U - VX\|_F^2 \quad (7)$$

which is based on the nonnegative matrix factorization objective of Eq. (1) (step S23), and $$F^{(2)}(X) = \frac{Tr(XLX^T)}{Tr(X\overline{L}X^T)} \quad (8)$$

which is based on the original graph embedding objective of Eq. (5) (step S25).

Before describing the present method of optimizing the objectives of Eqs. (7) and (8), it is helpful to first introduce the concept of Pareto optimality of multiple objectives. Pareto optimality is an important concept in the field of economics, and has been widely used in game theory and social sciences. A Pareto improvement is defined as a change in the status of a system from one status to another that can improve at least one objective without worsening any other objective. The Pareto optimal (or Pareto minimum) is defined as the status where no further Pareto improvements can be obtained. Based on these general definitions, the present approach first provides two Pareto optimal definitions (or equivalently Pareto minimum definitions) of the objectives in Eqs. (7) and (8).

Definition 1: A status updates in basis matrix V and feature matrix X [i.e. a change from a current status (V, X) to a new status (V', X')] is a Pareto improvement if either of the following two conditions is satisfied.

$$F^{(1)}(V',X') < F^{(1)}(V,X)$$

and $$F^{(2)}(V',X') \leq F^{(2)}(V,X) \quad 1)$$

$$F^{(1)}(V',X') \leq F^{(1)}(V,X)$$

and $$F^{(2)}(V',X') < F^{(2)}(V,X) \quad 2)$$

Definition 2: A current status (V*, X*) is a Pareto minimum (i.e. Pareto optimal) if there is no other status (V', X') such that a status-change from (V*, X*) to (V', X') is a Pareto improvement.

SNMF finds a Pareto minimum of the two objectives (as defined by Eq. (7) and (8)) (step S29) by achieving a Pareto improvement in every iteration (step S27). This approach is essentially different from previous approaches, which minimize a weighted sum of the two objectives. The present SNMF approach has several advantages over previous works, especially over NGE.

First, SNMF achieves higher descriptive power due to the effectiveness of the original ratio formulation of graph embedding, as shown in Eq. (8), over a weighed sum approximation, as taught by previous works. This formulation allows SNMF to operate without any additional concepts, such as the concept of complementary space utilized in NGE.

Second, SNMF need not sacrifice the NMF reconstruction error to improve the graph embedding objective, or sacrifice the graph embedding objective to improve the NMF reconstruction error because a Pareto improvement guarantees that both are non-increasing in every iteration. On the other hand, in previous works, it is not guaranteed that both these terms are consistently non-increasing because only their weighted sum is considered.

Third, the suggested optimization problem can be solved through simple multiplicative iterative updates, as will is shown below. Thus, SNMF has a significantly lower computational cost as compared to NGE. It may be noted that another approach known as multiplicative NGE also attempts to reduce the computational cost of NGE, but even compared with multiplicative NGE, the computational cost of SNMF is more economical since SNMF's multiplicative factors are simpler than those of multiplicative NGE. Furthermore unlike multiplicative NGE, SNMF need not compensate the norms of the bases into the coefficient matrix because the ratio formulation automatically prevents the objectives from trivially decreasing when the bases are rescaled.

Fourth, SNMF does not require any parameters since the two objectives of Eqs. (7) and (8) are separately considered. On the other hand, all previous works introduced parameters that must be tuned heuristically or empirically, which is cumbersome and in some cases difficult to be determined appropriately even by empirical validation. For example, NGE requires one to determine two parameters: 1) a weight parameter for balancing the NMF objective and the graph embedding objective; and 2) a size parameter for dividing the basis and coefficient matrices into two parts.

Lastly, SNMF can employ any definitions of similarity and dissimilarity matrices W and $\overline{W}$ (including negative values) if both $\text{Tr}(XLX^T)$ and $\text{Tr}(X\overline{L}X^T)$ are positive. These constraints are reasonable since $\text{Tr}(XLX^T)$ and $\text{Tr}(X\overline{L}X^T)$ are distance measures. By contrast, NGE requires more restricted constraints when defining the matrices. For example, in NGE, all the elements of W and $\overline{W}$ must be nonnegative because negative elements can make the objective of NGE be a non-convex function.

Before describing a detailed implementation of SNMF, a sample definition of W and $\overline{W}$ is provided. A presently preferred embodiment defines W and $\overline{W}$ by borrowing the concept of within-class and between-class distances of Linear Discriminant Analysis (LDA), as is generally described, for example, chapter 5 of book "*Pattern Classification*" by R. O. Duda, P. E. Hart, and D. G. Stork, published by Wiley-interscience, Hoboken, N.J., 2nd edition, 2001, which is hereby incorporated by reference. This approach begins by letting $y_i$ be a class label of the i-th sample and $n_c$ be the size of class c. Matrices $W=[W_{ij}]$ and $\overline{W}=[\overline{W}_{ij}]$ are then defined as $$W_{ij} = \begin{cases} \frac{1}{n_c} & \text{if } y_i, y_j \in c \\ 0 & \text{otherwise} \end{cases} \text{ and } \overline{W}_{ij} = \frac{1}{n} - W_{ij}$$

where n is the total number of data points

Note that the elements of $\overline{W}$ can be negative, which means that NGE cannot use W and $\overline{W}$ from the LDA formulation, as describe immediately above. Not only can SNMF adopt the LDA formulation in order to measure similarities, but other formulations can be adopted as well. For example, for multimodal data sets, the Marginal Fisher Analysis (MFA) formulation, which effectively reflects local relationships among data can be used. Information on MFA is provided in "Marginal Fisher Analysis and Its Variants For Human Gait Recognition and Content-based Image Retrieval", IEEE Trans on Image Processing, 16(11), 2007, by D. Xu, S. Yan, D. Tao, S. Lin, and H. J. Zhang, which is herein incorporated in its entirety.

A detailed implementation of SNMF now follows.

Figure 2:
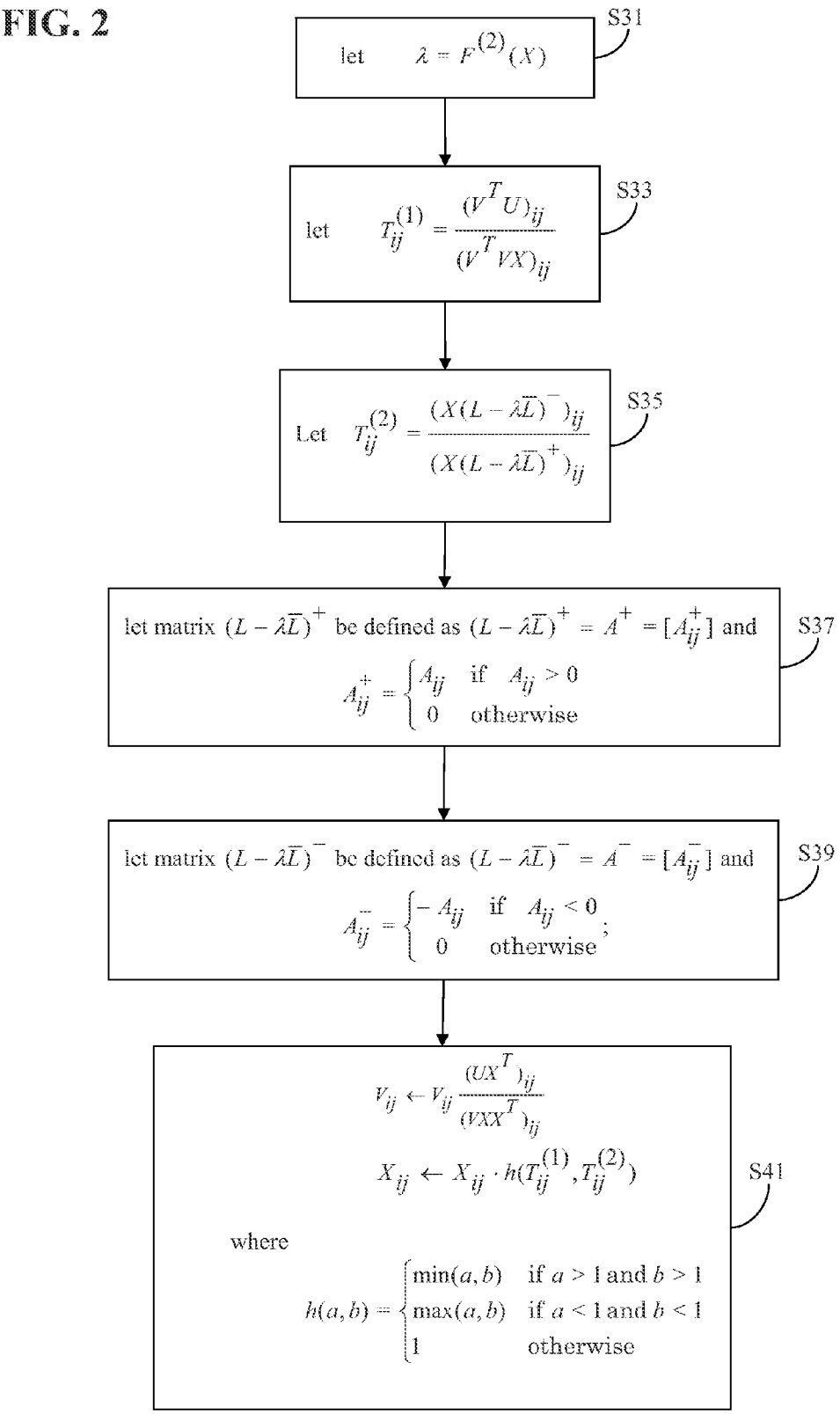
FIG. 2 illustrates multiplicative updates for application of Pareto optimization in accord with FIG. 1.

With reference to FIG. 2, the two SNMF objectives can be optimized by simple multiplicative updates. More formally, a Pareto improvement of $F^{(1)}$ and $F^{(2)}$ (as defined by Eqs. (7) and (8)) can be obtained by the following multiplicative updates: let $\lambda=F^{(2)}(X)$ (step S31) and let $$T_{ij}^{(1)} = \frac{(V^T U)_{ij}}{(V^T V X)_{ij}}$$ (10)

$$T_{ij}^{(2)} = \frac{(X(L-\lambda\overline{L})^-)_{ij}}{(X(L-\lambda\overline{L})^+)_{ij}}$$

(steps S33 and S35) where matrix $(L-\lambda\overline{L})^+=A^+=[A_{ij}^+]$ (step S37) and matrix $(L-\lambda L)^-=A^-=[A_{ij}^-]$ (step S39) are defined as $$A_{ij}^+ = \begin{cases} A_{ij} & \text{if } A_{ij} > 0 \\ 0 & \text{otherwise} \end{cases}$$ (11)

$$A_{ij}^- = \begin{cases} -A_{ij} & \text{if } A_{ij} < 0 \\ 0 & \text{otherwise} \end{cases}$$

A Pareto minimum (i.e. Pareto optimal) of $F^{(1)}$ and $F^{(2)}$ can be obtained by applying the following multiplicative updates iteratively (step S41).

$$V_{ij} \leftarrow V_{ij} \frac{(UX^T)_{ij}}{(VXX^T)_{ij}}$$ (12)

$$X_{ij} \leftarrow X_{ij} \cdot h(T_{ij}^{(1)}, T_{ij}^{(2)})$$ (13)

where $$h(a, b) = \begin{cases} \min(a, b) & \text{if } a > 1 \text{ and } b > 1 \\ \max(a, b) & \text{if } a < 1 \text{ and } b < 1 \\ 1 & \text{otherwise} \end{cases}$$ (14)

SNMF can be easily adopted for other NMF variants; e.g., polynomial kernel NMF (as described in "Non-negative Matrix Factorization In Poly-nominal Feature Space", IEEE Trans. On Neural Networks, 19(6):1090-1100, 2008, by I. Bucis, N. Nikolaidis, and I. Pitas) and kernel NMF (as described in "Nonlinear Nonnegative Component Analysis", CVPR, pages 2860-2865, 2009, by S. Zafeiriou and M. Petrou). To incorporate other NMF variants with graph embedding, one can simply combine the updates of the coefficient matrix with $T_{ij}^{(2)}$ in Eq. (10), which is the multiplicative update factor of graph embedding, as in Eq. (13).

Now the topic of convergence analysis is discussed. First it may be noted, however, that in their seminal work, Lee and Seung, mentioned above, did not prove that the limit point obtained by the multiplicative updates is a local optimum. This convergence issue has been analyzed and resolved by Lin, as described in his paper, "On the Convergence of Multiplicative Update Algorithms For Non-negative Matrix Factorization", IEEE Transactions on Neural Networks, 18:1589-1596, 2007, which is herein incorporated in its entirety by reference. Lin achieves this by adding a small non-zero quantity to the denominators of the updates. If desired, the limit point obtained by the updates of SNMF in accord with the present invention can be shown to be a Pareto minimum by the same method.

Returning to the subject of convergence analysis, it is helpful to first reintroduce the concept of the auxiliary function, which is used by numerous researchers in the community, and to provided a few definitions, lemmas, proofs, and theorems, as follows:

Definition 3: $G(x, x')$ is an auxiliary function for $F(x)$ if the two following conditions are satisfied.

$$G(x,x') \geq F(x), G(x,x) = F(x) \tag{15}$$

This definition is useful with the following Lemma.

Lemma 1: If $G(x, x')$ is an auxiliary function, then $F(x)$ is non-increasing under the update of $G(x, x^t)$ such that $G(x, x^t) \leq G(x^t, x^t)$.

Proof: $F(x^{t+1}) \leq G(x^{t+1}, x^t) \leq G(x^t, x^t) \leq F(x^t)$

Since only $F^{(1)}$ includes basis matrix V, a Pareto improvement on $F^{(1)}$ and $F^{(2)}$ can be accomplished by the update of V in Eq. (12) when X is fixed, unless a Pareto minimal is already achieved. Thus, the next step is to show that Eq. (13) also performs a Pareto improvement of X when V is fixed, unless a Pareto minimal is already achieved.

Lemma 2: $F^{(1)}$ is non-increasing under the following update rule when V is fixed.

$$X_{ij} \leftarrow X_{ij} \cdot h(T_{ij}^{(1)}, a) \tag{16}$$

where a is an arbitrary number. $X_{ij}$ is changed by this update, i.e., if $X_{ij} \neq 0$ and $h(T_{ij}^{(1)}, a) \neq 1$, then $F^{(1)}$ is decreasing.

Proof: The following update is considered first:

$$X_{ij} \leftarrow X_{ij} T_{ij}^{(1)} \tag{17}$$

This is the update of normal NMF. Since $F^{(1)}$ is the objective of normal NMF, $F^{(1)}$ is non-increasing under this update. And, if $X_{ij} \neq 0$ and $T_{ij}^{(1)} \neq 1$, then $F^{(1)}$ is decreasing.

Let $X^{(ij)}(x)$ be a matrix X whose (i, j) element is replaced with x. Then, for any $0 \leq c \leq 1$, $$F^{(1)}(V, X) = (1-c)F^{(1)}(V, X) + cF^{(1)}(V, X) \tag{18}$$
$$\geq (1-c)F^{(1)}(V, X) + cF^{(1)}\left(V, X^{(ij)}\left(X_{ij} T_{ij}^{(1)}\right)\right)$$

Since $F^{(1)}(V, X)$ is a convex function of $X_{ij}$, $$F^{(1)}(V, X) \geq F^{(1)}\left(V, (1-c)X + cX^{(ij)}\left(X_{ij} T_{ij}^{(1)}\right)\right) \tag{19}$$
$$= F^{(1)}\left(V, X^{(ij)}\left((1-c)X_{ij} + cX_{ij} T_{ij}^{(1)}\right)\right)$$
$$= F^{(1)}\left(V, X^{(ij)}\left(X_{ij}\left(1 - c + cT_{ij}^{(1)}\right)\right)\right)$$

Let $z = 1 - c + cT_{ij}^{(1)}$. If $T_{ij}^{(1)} < 1$, z can be any value between 1 and $T_{ij}^{(1)}$. Similarly, if $T_{ij}^{(1)} < 1$, z can be any value between $T_{ij}^{(1)}$ and 1. If $T_{ij}^{(1)} = 1$, then $z = 1$. Therefore, $F^{(1)}$ is non-increasing under the update rule $$X_{ij} \leftarrow X_{ij} z \tag{20}$$

for any z such that $$\begin{cases} 1 \leq z \leq T_{ij}^{(1)} & \text{if } T_{ij}^{(1)} > 1 \\ T_{ij}^{(1)} \leq z \leq 1 & \text{if } T_{ij}^{(1)} < 1 \\ 1 & \text{otherwise} \end{cases} \tag{21}$$

This update rule is equivalent to the update in Eq. (16).

Both the equalities in Eqs. (18) and (19) hold only if $X_{ij} = 0$ or $T_{ij}^{(1)} = 1$ or $c = 0$. Thus, if $X_{ij} \neq 0$ and $z \neq 1$, which is equivalent to $h(T_{ij}^{(1)}, a) \neq 1$, the inequalities are strict and $F^{(1)}$ is decreasing. Before moving on to $F^{(2)}$, an idea of where $T_{ij}^{(2)}$ in Eq. (10) is derived from is provided. To do so, one defines $$K(X) = Tr(XLX^T) - \lambda Tr(X\overline{L}X^T) \tag{22}$$

which is obtained by transforming $F^{(2)}$ into the difference form. This K plays an auxiliary role in the proof on $F^{(2)}$. Now suppose that $\lambda$ is an arbitrary number.

In order to integrate the non-negative constraints into K, one can set $\Phi = [\Phi_{ij}]$ as a Lagrange multiplier matrix, in which $\Phi_{ij}$ is the Lagrange multiplier for the constraint $X_{ij} \geq 0$. Then the Lagrange $\mathcal{L}$ for K is defined as $$L = Tr(XLX^T) - \lambda Tr(X\overline{L}X^T) + Tr(\Phi X^T) \tag{23}$$

By setting the derivative of $\mathcal{L}$ to zero, one obtains $$\frac{\partial L}{\partial X} = 2XL - 2\lambda X\overline{L} + \Phi = 0 \tag{24}$$

Along with KKT condition of $\Phi_{ij} X_{ij} = 0$ described in "Nonlinear programming", Proceedings of 2nd Berkeley Symposium, 1951, by H. Kuhn and A. Tucker, and herein incorporated in its entirety by reference, $$2(XL)_{ij} X_{ij} - 2\lambda (X\overline{L})_{ij} X_{ij} + \Phi_{ij} X_{ij} = 2(X(L - \lambda \overline{L})^+)_{ij} X_{ij} - 2(X(L - \lambda \overline{L})^-)_{ij} X_{ij} = 0 \tag{25}$$

From this equation, one can obtain the following update.

$$X_{ij} \leftarrow X_{ij} \frac{(X(L - \lambda \overline{L})^-)_{ij}}{(X(L - \lambda \overline{L})^+)_{ij}} = X_{ij} T_{ij}^{(2)} \tag{26}$$

Lemma 3: K is non-increasing under the following update rule.

$$X_{ij} \leftarrow X_{ij} T_{ij}^{(2)} \tag{27}$$

Proof: The first order and second order derivatives of K with respect to $X_{ij}$ are respectively computed as $$\frac{\partial K}{\partial X_{ij}} = 2(X(L - \lambda \overline{L}))_{ij}, \quad \frac{\partial^2 K}{\partial X_{ij}^2} = 2(L - \lambda \overline{L})_{jj} \tag{28}$$

Let $K^{(ij)}$ be a function obtained by isolating $X_{ij}$ term from K. Then, one can define G as an auxiliary function of $K^{(ij)}$ by replacing the second order derivative in the Taylor series expansion of $K^{(ij)}$.

$$G(X_{ij}, X_{ij}^t) = K^{(ij)}(X_{ij}^t) + \frac{\partial K}{\partial X_{ij}}\bigg|_{X_{ij} = X_{ij}^t} \tag{29}$$

-continued $$(X_{ij} - X_{ij}^t) + \frac{(X^t(L-\lambda\overline{L})^+)_{ij}}{X_{ij}^t}(X_{ij} - X_{ij}^t)^2$$

To verify that G is an auxiliary function of K, one needs to show $$G(X_{ij}, X_{ij}^t) - K^{(ij)}(X_{ij}) = \left(\frac{(X^t(L-\lambda\overline{L})^+)_{ij}}{X_{ij}^t} - (L-\lambda\overline{L})_{jj}\right)(X_{ij} - X_{ij}^t)^2 \geq 0 \quad (30)$$

which is equivalent to $$(X^t(L-\lambda\overline{L})^+)_{ij} - X_{ij}^t(L-\lambda\overline{L})_{jj} \geq 0 \quad (31)$$

This inequality is satisfied because $$(X^t(L-\lambda\overline{L})^+)_{ij} = \Sigma_{k=1}^n X_{ik}^t(L-\lambda\overline{L})_{kj}^+ \geq X_{ij}^t(L-\lambda\overline{L})_{jj}^+ \geq X_{ij}^t(L-\lambda\overline{L})_{jj} \quad (32)$$

$G(X_{ij}, X_{ij}^t)$ is convex; thus, solving $$\frac{\partial G(X_{ij}, X_{ij}^t)}{\partial X_{ij}} = 0$$

yields $X_{ij}^{t+1}$ by Lemma 1.

$$X_{ij}^{t+1} = X_{ij}^t \frac{(X^t(L-\lambda\overline{L})^+)_{ij} - (X^t(L-\lambda\overline{L}))_{ij}}{(X^t(L-\lambda\overline{L})^+)_{ij}} \quad (33)$$

$$= X_{ij}^t \frac{(X^t(L-\lambda\overline{L})^-)_{ij}}{(X^t(L-\lambda\overline{L})^+)_{ij}} = X_{ij}^t T_{ij}^{(2)}$$

Since G is an auxiliary function of K, K is also non-increasing under this update.

Lemma 4: K is non-increasing under the following update rule.

$$X_{ij} \leftarrow X_{ij} \cdot h(T_{ij}^{(2)}, b) \quad (34)$$

where b is an arbitrary number. If $X_{ij}$ is changed by this update, i.e., if $X_{ij} \neq 0$ and $h(T_{ij}^{(2)}, b) \neq 1$, then K is decreasing.

Proof: Let $X_{ij}^{t+1} = X_{ij}^t T_{ij}^{(2)}$. Then, for any $0 \leq c \leq 1$, $$G(X_{ij}^t, X_{ij}^t) = (1-c)G(X_{ij}^t, X_{ij}^t) + cG(X_{ij}^t, X_{ij}^t) \geq (1-c)G(X_{ij}^t, X_{ij}^t) + cG(X_{ij}^{t+1}, X_{ij}^t) \quad (35)$$

Since $G(X_{ij}, X_{ij}^t)$ is convex, $$G(X_{ij}^t, X_{ij}^t) \geq G((1-c)X_{ij}^t + cX_{ij}^{t+1}, X_{ij}^t) \quad (36)$$

$$= G((1-c)X_{ij}^t + cX_{ij}^t T_{ij}^{(2)}, X_{ij}^t)$$

$$= G(X_{ij}^t(1 - c + cT_{ij}^{(2)}), X_{ij}^t)$$

Let $z=1-c+cT_{ij}^{(2)}$. In the same way as in Lemma 2, one can show that $G(X_{ij}, X_{ij}^t)$ is non-increasing under the update rule $$X_{ij} \leftarrow X_{ij} z \quad (37)$$

for any z such that $$\begin{cases} 1 \leq z \leq T_{ij}^{(2)} & \text{if } T_{ij}^{(2)} > 1 \\ T_{ij}^{(2)} \leq z \leq 1 & \text{if } T_{ij}^{(2)} < 1 \\ 1 & \text{otherwise} \end{cases} \quad (38)$$

This update rule is equivalent to the update in Eq. (34). Since G is an auxiliary function of K, K is also non-increasing under the update in Eq. (34) by Lemma 1. In the same way as in Lemma 2, one can show that the inequalities in Eqs. (35) and (36) are strict if $X_{ij} \neq 0$ and $h(T_{ij}^{(2)}, b) \neq 1$.

Lemma 5: $F^{(2)}$ is non-increasing under the update in Eq. (34) if $$\lambda = F^{(2)}(X^t) = \frac{Tr(X^t L X^{tT})}{Tr(X^t \overline{L} X^{tT})} \quad (39)$$

at iteration t. If $X_{ij}$ is changed under the update, then $F^{(2)}$ is decreasing.

Proof: Suppose that $X_{ij}^{t+1}$ is obtained from $X_{ij}^t$ by applying the update in Eq. (34); i.e., $X_{ij}^{t+1} = X_{ij}^t \cdot h(T_{ij}^{(2)}, b)$. Since K(X) is non-increasing under the update in Eq. (34), $$Tr(X^{t+1}LX^{t+1T}) - \lambda Tr(X^{t+1}\overline{L}X^{t+1T}) = K(X^{t+1}) \leq K(X^t) = 0 \quad (40)$$

One ensures that $Tr(X\overline{L}X^T)$ is always positive; thus, $$F^{(2)}(X^{t+1}) = \frac{Tr(X^{t+1}LX^{t+1T})}{Tr(X^{t+1}\overline{L}X^{t+1T})} \leq \lambda = F^{(2)}(X^t) \quad (41)$$

If $X_{ij}$ is changed, the inequality in Eq. (40) is strict so that the inequality in Eq. (41) is also strict.

Theorem 1: A Pareto improvement on $F^{(1)}$ and $F^{(2)}$ can be achieved by the update rules in Eqs. (10) to (14) unless a Pareto minimal is already achieved.

Proof: By Lemmas 2 and 5, either $F^{(1)}$ or $F^{(2)}$ is decreasing under the update rule in Eqs. (10) to (14) unless X and V are at a stationary point which is a Pareto minimum of $F^{(1)}$ and $F^{(2)}$.

The above described method of SNMF, which, as is illustrated below, is well suited for data classification, may be implemented in various types of data processing hardware.

Figure 3:
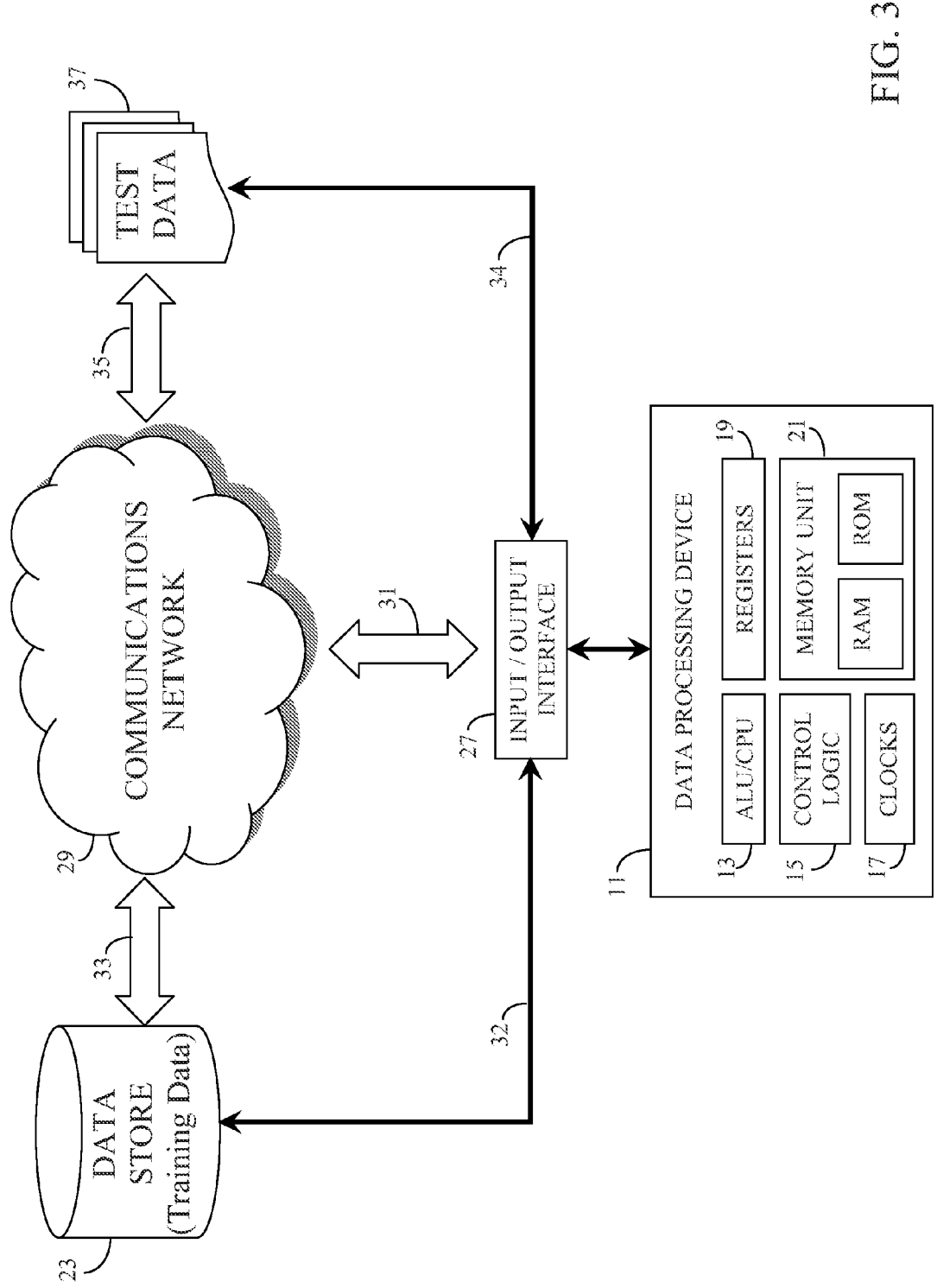
FIG. 3 shows exemplary hardware for implementing the present invention.

With reference to FIG. 3, a general example of such data processing hardware includes a data processing device 11. As it is known in the art, data processing device 11 may be a micro-computer, a central processing unit (CPU), a specilized image processor, a programmable logic device (PLD), a complex programmable logic device (CPLD), an application specific integrated circuit (ASIC), or other computing device. In general, data processing device 11 may include an arithmetic logic unit (ALU) or CPU 13, control logic 15, various timing clocks 17, various types of registers 19 (including data registers, shift registers, workspace registers, status registers, address registers, interrupt registers, instruction registers, program counters, etc.), and a memory unit 21 (including RAM and/or ROM).

In the present example of FIG. 3, raw data matrix U of n samples, which may consist of training data when used for data classification or categorization, may be maintain in a data store 23. Data processing device 11 may directly access data store 23 via a direct link 32 and appropriate input/output interface 27, or may alternatively access data store 23 via communication links 31/33 and network 29, which may be a LAN, WLAN, or the Internet.

Similarly, test data 37, which is the data that is to be classified, may be accessible via a direct link 34 or through communication network 29 and communication links 31/35. It is to be understood that test data 37 may be an archive of data (such as a store of face images) or may be generated in real time (such as face images created by surveillance cameras). It is further to be understood that communication links 31-35 may be wired or wireless communication links.

In the following section, the presently preferred embodiment is evaluated using three standard face databases in public use in the field: the FERET database, the JAFFE database, and the AR database.

The FERET database contains 420 images of 70 people. For each subject person, six frontal-view images are provided.

The JAFFE database contains 213 images of 10 Japanese female subjects. For each subject, 3 or 4 samples for each of 7 basic facial expressions are provided.

The AR database contains 4000 images of 126 people, including 70 men and 56 women, and provides frontal-view images with different facial expressions, illumination conditions, and natural occlusions for each person.

For evaluation purposes, once the face region is cropped, each image is down-sampled to 32×32 pixels for the FERET and AR databases, and down-sampled to 40×30 pixels for the JAFFE database. Following the typical approach of previous works, three images from each person in the FERET database, 150 images from the JAFFE database, and seven images from each person of the AR database are randomly selected as a training set (i.e. training data), and the rest are utilized as a test set (i.e. test data).

To test the effectiveness of the present SNMF approach, SNMF is compared with seven other popular subspace learning algorithms: Principal Component Analysis (PCA), Independent Component Analysis (ICA), Nonnegative Matrix Factorization (NMF), Localized NMF (LNMF), Linear Discriminant Analysis (LDA), Marginal Fisher Analysis (MFA), and Nonnegative Graph Embedding (NGE). For NGE, the multiplicative updates proposed in "Multiplicative Nonnegative Graph Embedding", CVPR, 2009, by Wang et al., are implemented, and the parameter for balancing the NMF part and the graph embedding part is set to 1, as is suggested in "Non-negative Graph Embedding", CVPR, 2008, by Yang et al.

For MFA and NGE, the protocol described in "Marginal Fisher Analysis and Its Variants For Human Gait Recognition and Content-based Image Retrieval", IEEE Trans on Image Processing, 16(11), 2007, by Xu et al. is followed to build the intrinsic graph and the penalty graph.

For classification, as is conventional, the 1-Nearest Neighbor classifier (1-NN) is used because of its computational efficiency. After testing 10 times, the mean and the standard deviation of the classification accuracies are reported. A sufficient number of dimensions that nearly cover all possible dimensions of the embedding space are explored, and the best performance is reported.

Figures 4, 5:
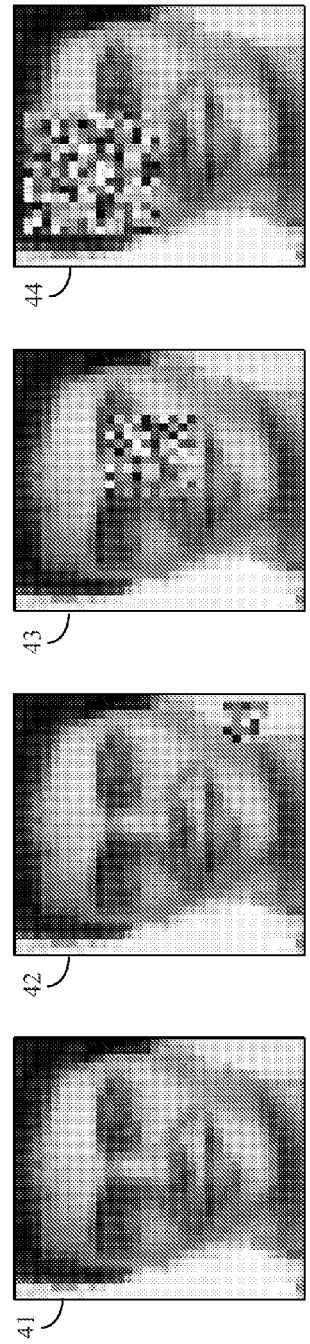
FIG. 4 shows Table 1 summarizing a comparison of the recognition properties of the present invention (SNMF) versus various other recognition methods known in the art.
FIG. 5 shows examples of three sizes of synthetic occlusions placed on a reference image.

With reference to Table 1 in FIG. 4, the classification capability of the present SNMF approach is compared with the above-noted seven subspace learning algorithms, as applied to the FERET and JAFFE databases. Performance for SNMF exceeds both the classical dimension reduction methods (PCA and ICA) as well as NMF variants (NMF, LNMF, and NGE). In particular, SNMF outperforms NGE although the two approaches are developed from the similar idea, which indicates the formulation of SNMF generates more discriminative features than NGE.

Superior performance of SNMF as compared to other supervised methods, namely LDA and MFA, can be attributed to the fact that SNMF minimizes the reconstruction error while utilizing label information. In this respect, SNMF has both the advantages of unsupervised representation approaches and supervised classification approaches. LDA performs comparable to present SNMF method on FERET and JAFFE databases; however, LDA is not robust to variations, as shown below. MFA also reports slightly less accuracy than SNMF on JAFFE, but the performance gap between the two approaches is significant on the FERET database. MFA tends to over reduce the dimension of data during its preprocessing step to avoid singular value issues when the number of training samples is small relatively to the number of classes. Compared to LDA and MFA, the present approach reliably demonstrates the best performance.

In another exemplary application of the present invention, synthetic patches (i.e. occlusions regions that hide a region of an image) are placed on the original images from FERET and JAFFE database. The patch pixel sizes are one of 5×5, 10×10, and 15×15, and the patch locations are randomly chosen. For each of patch sizes, recognition accuracies after 10 tests were computed.

Figure 6A:
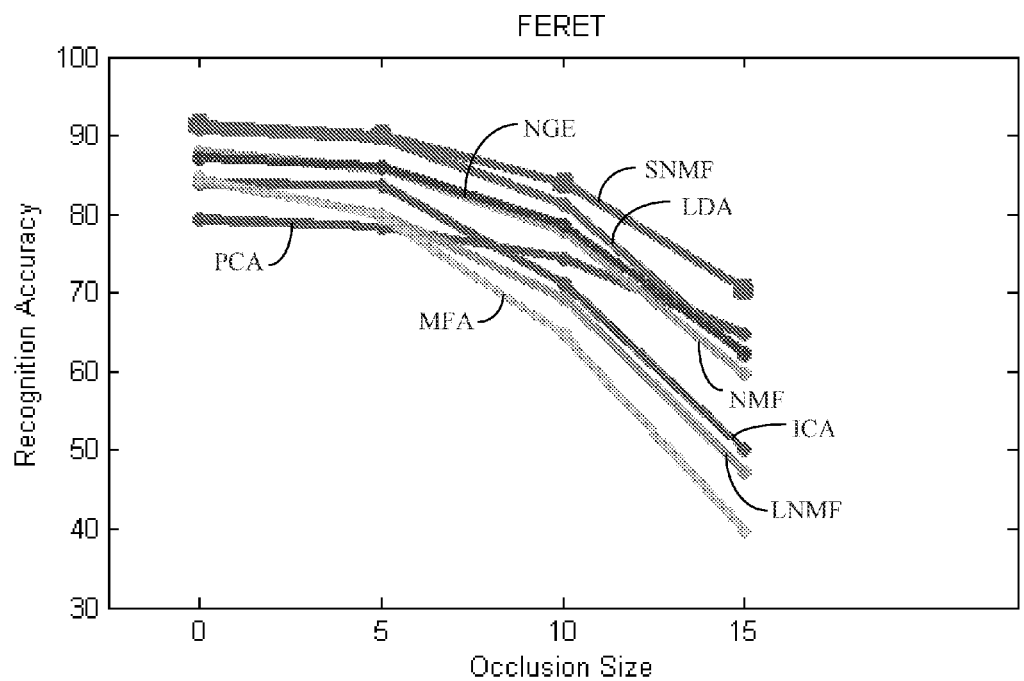
FIG. 6A shows compares the results of the present invention versus various known recognition methods applied to the FERRET database with the synthetic occlusions of FIG. 5.
Figure 6B:
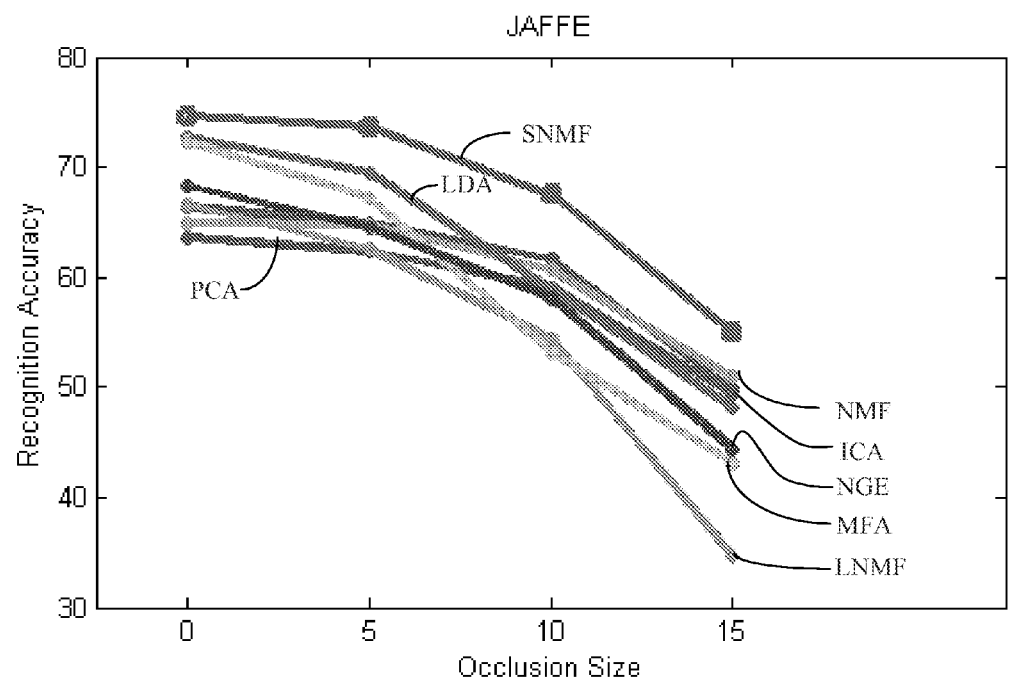
FIG. 6B shows compares the results of the present invention versus various known recognition methods applied to the JAFFE database with the synthetic occlusions of FIG. 5.

For example, FIG. 5 shows four sample images 41-44 from the FERET database with three of the four images having synthetic occlusions. The leftmost image 41 is the original image. From second left to right, the occlusion sizes are 5×5 pixels for image 42, 10×10 pixels for image 43, and 15×15 pixels for image 44. The locations of occlusions are randomly selected The results for FERRET database are shown in the plot of FIG. 6A, and the results for the JAFFE database are shown in plot of FIG. 6B. As can be seen, SNMF constantly dominates the other approaches. The greater the occlusion sizes are, the clearer the performance gaps between SNMF and the other methods are. Of particular interest is the performance of LDA which is comparable to SNMF in the case of no occlusion, but drops drastically with growing occlusion size.

Although SNMF is robust to synthetic occlusions, the result does not necessarily imply that the algorithm is robust to natural variations in real world situations. The AR database is used to investigate how SNMF performs with natural variations. The AR database is selected since it contains various real world variations, such as different facial expressions, illumination conditions, and natural occlusions. Sample images of the AR database are illustrated in FIG. 7.

Figures 7, 8:
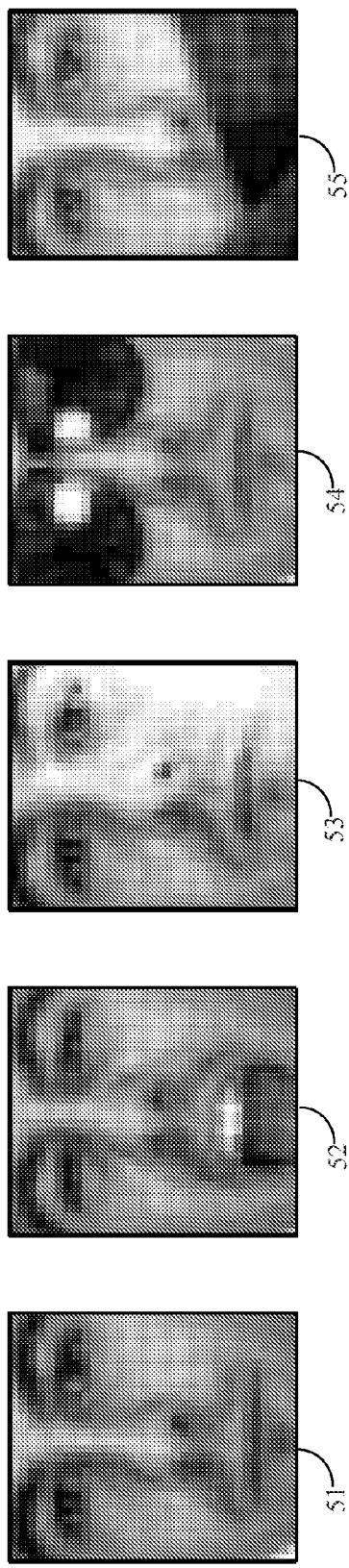
FIG. 7 illustrates five sample images with natural variations provided by the AR database.
FIG. 8 shows Table 2, which compares the present invention to various recognition methods known in the art when applied to the AR database.

As is illustrated in the sample images of the AR database shown in FIG. 7, the AR database provides reference subject (51) and also provides different facial expressions (52), illumination conditions (53), and natural occlusions (54 and 55) of the same subject.

Face recognition accuracies (%) on the AR database are shown in Table 2 of FIG. 8. After testing 10 times, the mean and the standard deviation of the 10 accuracies are reported.

As can be seen in Table 2, SNMF outperforms the other techniques for the AR database as well, which implies that SNMF can be successfully applied to real world problems. LDA performs much worse than SNMF on the AR database due to the large variations within the same class. SNMF clearly outperforms NGE as well. Based on the experimental results, it is put forth that the complementary space idea does not effectively maximize separability of the penalty graph when within-class variation is large, as evident in the AR database. In such a case, NGE jumbles up features from different classes while minimizing compactness of the intrinsic graph.

It is further put forth that SNMF shows more discriminating power and robustness to variations because SNMF not only produces generally sparse bases, but also ignores uninformative details based on class labels. In this respect, the bases of SNMF are meaningfully sparse.

Figure 9:
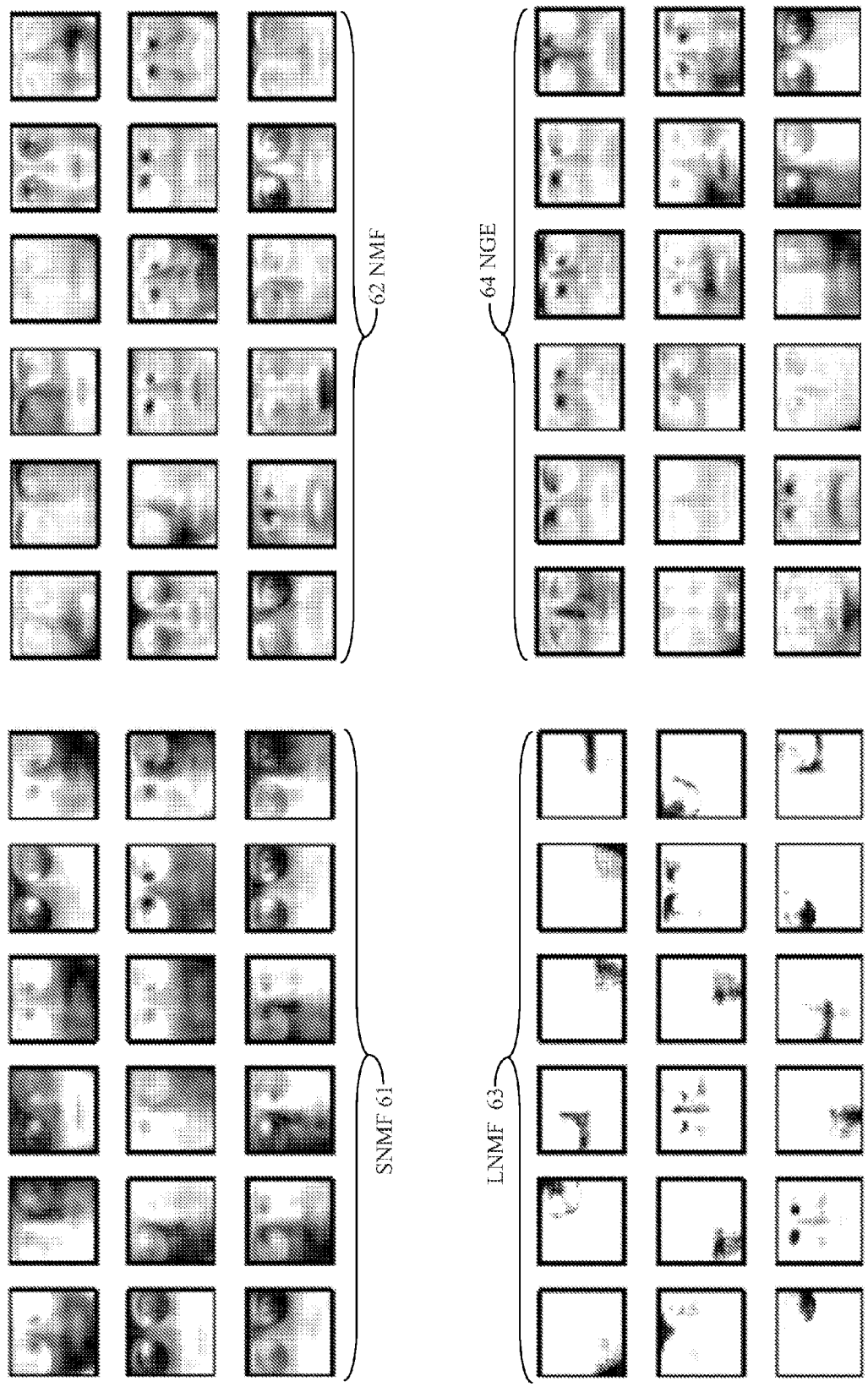
FIG. 9 shows the basis images of SNMF (61), NMF (62), LNMF (63), and NGE (64) for the AR database

For illustrative purposes, FIG. 9 shows the basis images of SNMF (61), NMF (62), LNMF (63), and NGE (64) for the AR database. The basis images of SNMF 61 describe less details than those of NMF 62 and NGE 64 since SNMF effectively excludes meaningless details. Although the basis images of LNMF 63 are sparser, they do not contain meaningful local components.

SNMF also has advantages on localization. In the basis images of SNMF 61, one can more clearly see each face component and variation: e.g., eyes vs. mouth regions, sunglasses, scarves, and illumination changes. SNMF automatically assigns more basis images to describe more informative parts by minimizing both the reconstruction error and the noise/signal ratio.

In this work, concept of SNMF, which generates a descriptive part-based representation of data, based on the concept of NMF aided by the discriminative idea of graph embedding is proposed. An iterative procedure which optimizes the suggested formulation based on Pareto optimization is presented. The formulation presented in this work removes the dependence on combined optimization schemes, which can be divergent without proper parameter tuning. The analytical and empirical evidence show that SNMF has advantages over popular subspace learning techniques as well as the state-of-the-art in the relevant field. We believe that the idea of SNMF can be successfully applied to other application domains, such as spam filtering and gene expression discovery. We leave the experimental validation as future work. Another future direction is to develop faster algorithms of SNMF based on recently proposed faster NMF algorithms.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of factorizing a data matrix U file by supervised nonnegative factorization, SNMF, comprising:
   providing a data processing device to implement the following step:
   accessing said data matrix U from a data store, wherein data matrix U is defined as $U \in R^{d \times n}$;
   defining an intrinsic graph G, wherein $G=\{U,W\}$, each column of $U \in R^{d \times n}$ represents a vertex, and each element of similarity matrix W measures the similarity between vertex pairs;
   defining a penalty graph $\overline{G}$, wherein $\overline{G}=\{U,\overline{W}\}$ and each element of dissimilarity matrix $\overline{W}$ measures unfavorable relationships between said vertex pairs;
   defining an intrinsic diagonal matrix D, wherein $D=[D_{ij}]$ and $D_{ii} = \Sigma_{j=1}^{n} W_{ij}$;
   defining an intrinsic Laplacian matrix L, wherein $L = D - W$;
   defining a penalty diagonal matrix $\overline{D}$, wherein $\overline{D}=[\overline{D}_{ij}]$ and $\overline{D}_{ii}=\Sigma_{j=1}^{n}\overline{W}_{ij}$;
   defining a penalty Laplacian matrix $\overline{L}$, wherein $\overline{L}=\overline{D}-\overline{W}$;
   defining a basis matrix V, where $V \in R^{d \times r}$;
   defining a feature matrix X, where $X \in R^{r \times n}$;
   defining a measure of the compactness of intrinsic graph G by the weighted sum of squared distances defined as $\Sigma_{i<j}^{n} W_{ij} \|x_i - x_j\|^2 = Tr(XLX^T)$, wherein $x_i$ is the i-th column of X and $x_j$ is j-th column of X;
   defining a measure of the separability of penalty graph $\overline{G}$ by the weighted sum of squared distances defined as $\Sigma_{i<j}^{n} \overline{W}_{ij} \|x_i - x_j\|^2 = Tr(X\overline{L}X^T)$, wherein $x_i$ is the i-th column of X and $x_j$ is j-th column of X;
   defining $F^{(1)}(V,X)$ as an objective of NMF (nonnegative matrix factorization), wherein $F^{(1)}(V,X) = \|U - VX\|_F^2$;
   defining $F^{(2)}(X)$ as an objective of graph embedding, where $$F^{(2)}(X) = \frac{Tr(XLX^T)}{Tr(X\overline{L}X^T)};$$

applying Pareto optimality to $F^{(1)}(V,X)$ and $F^{(2)}(X)$; and
   defining the final state $V^*$, $X^*$ of matrices V and X at the Pareto optimal resulting from application of said Pareto optimality as a factorization of data matrix U.

2. The method of claim 1, wherein data matrix U is comprised of n samples and each column of U represents a sample.

3. The method of claim 2, wherein each of said samples is an image file.

4. The method of claim 1, wherein W and $\overline{W}$ are generated from true relationships among data pairs.

5. The method of claim 4, wherein said data pairs are class labels of data.

6. The method of claim 1, wherein and each column of feature matrix X is a low dimensional representation of the corresponding column of U.

7. The method of claim 1, wherein the ratio formation of $F^{(2)}(X)$ is handled without any transformation.

8. The method of claim 1, wherein at least one of similarity matrix W or dissimilarlty matrix $\overline{W}$ has negative values.

9. The methd claim 8, wherein $Tr(XLX^T)$ and $Tr(X\overline{L}X^T)$ are positive.

10. The method of claim 1, wherein said Pareto optimality is applied directly on said ratio formulation of $F^{(2)}(X)$ in the absence of any weighed sum approximation.

11. The method of claim 1, wherein said Pareto optimality is applied through a series of Pareto improvement status update iterations defined as a change from a current status (V,X) to a new status (V',X') that achieves a Pareto improvement until said Pareto optimal is achieved, and a status update is a Pareto improvement if either of the following two conditions is satisfied:

$$F^{(1)}(V',X') < F^{(1)}(V,X)$$

and $$F^{(2)}(V',X') \leq F^{(2)}(V,X) \quad\quad 1)$$

$$F^{(1)}(V',X') \leq F^{(1)}(V,X)$$

and $$F^{(2)}(V',X') < F^{(2)}(V,X) \quad\quad 2)$$

and wherein
   a current status is a Pareto optimal $(V^*,X^*)$ if there is no other status (V',X') such that a status update iteration from $(V^*,X^*)$ to (V',X') is a Pareto improvement.

12. The method of claim 1, wherein said Pareto optimality is applied to $F^{(1)}(V,X)$ and to $F^{(2)}(X)$ through iteratively multiplicative updates until said Pareto optimal is achieved; and letting $\lambda = F^{(2)}(X)$;

$$T^{(1)}_{ij} = \frac{(V^T U)_{ij}}{(V^T V X)_{ij}};$$

letting $$T^{(2)}_{ij} = \frac{(X(L-\lambda\overline{L})^-)_{ij}}{(X(L-\lambda\overline{L})^+)_{ij}}$$

letting
letting matrix $(L-\lambda\overline{L})^+$ be defined as $(L-\lambda\overline{L})^+ = A^+ = [A_{ij}^+]$ and $$A_{ij}^+ = \begin{cases} A_{ij} & \text{if } A_{ij} > 0 \\ 0 & \text{otherwise;} \end{cases}$$

letting matrix $(L-\lambda\overline{L})^-$ be defined as $(L-\lambda\overline{L})^- = A^- = [A_{ij}^-]$ and $$A_{ij}^- = \begin{cases} -A_{ij} & \text{if } A_{ij} < 0 \\ 0 & \text{otherwise;} \end{cases}$$

and said multiplicative updates are defined as:

$$V_{ij} \leftarrow V_{ij} \frac{(UX^T)_{ij}}{(VXX^T)_{ij}}$$

$$X_{ij} \leftarrow X_{ij} \cdot h(T^{(1)}_{ij}, T^{(2)}_{ij})$$

where $$h(a,b) = \begin{cases} \min(a,b) & \text{if } a > 1 \text{ and } b > 1 \\ \max(a,b) & \text{if } a < 1 \text{ and } b < 1 \\ 1 & \text{otherwise.} \end{cases}$$

13. The method of claim 12, wherein said Pareto optimal is achieved when said multiplicative updates reach a stationary point.

14. The method of claim 1, wherein similarity matrix W and dissimilarity matrix $\overline{W}$ are defined by the concept of within-class and between-class distances of Linear Discriminant Analysis (LDA).

15. The method of claim 14, wherein:
similarity matrix $W = [W_{ij}]$ is defined as:

$$W_{ij} = \begin{cases} \frac{1}{n_c} & \text{if } y_i, y_j \in c \\ 0 & \text{otherwise} \end{cases}$$

wherein $y_i$ is a class label of the i-th sample, $y_j$ is a class label of the j-th sample, and $n_c$ is the size of class c ; and dissimilarity matrix $\overline{W} = [\overline{W}_{ij}]$ is defined as $$\overline{W}_{ij} = \frac{1}{n} - W_{ij}$$

wherein n is the number of data points.

16. A method of classifying test data, comprising:
arranging a set of training data into a data matrix U;
applying the supervised nonnegative factorization method of claim 1 to data matrix U to identify the Pareto optimal state V* and X* of factorizing matrices V and X at the Pareto optimal;
classifying said test data only according to the classification defined by X*.

17. A data classification system for classifying test data, comprising:
a data processing device with access to a data matrix U of training data and with access to said test data, said data matrix U being defined as $U \in R^{d \times n}$;
wherein
an intrinsic graph G is defined as $G = \{U, W\}$ , each column of $U \in R^{d \times n}$ representing a vertex and each element of similarity matrix W measuring the similarity between vertex pairs;
a penalty graph $\overline{G}$ is defined as $\overline{G} = \{U, \overline{W}\}$ and each element of dissimilarity matrix $\overline{W}$ measures unfavorable relationships between said vertex pairs;
an intrinsic diagonal matrix D is defined as $D = [D_{ij}]$ and $D_{ii} = \sum_{j=1}^{n} W_{ij}$;
an intrinsic Laplacian matrix L is defined as $L = D - W$ ;
a penalty diagonal matrix $\overline{D}$ is defined as $\overline{D} = [\overline{D}_{ij}]$ and $\overline{D}_{ii} = \sum_{j=1}^{n} \overline{W}_{ij}$;
a penalty Laplacian matrix $\overline{L}$ is defined as $\overline{L} = \overline{D} - \overline{W}$;
a basis matrix V is defined as $V \in R^{d \times r}$;
a feature matrix X is defined as $X \in R^{r \times n}$;
a measure of the compactness of intrinsic graph G is defined by the weighted sum of squared distances defined as $\sum_{i<j}^{n} W_{ij} \|x_i - x_j\|^2 = Tr(XLX^T)$, wherein $x_i$ is the i-th column of X and $x_j$ is j-th column of X;
a measure of the separability of penalty graph $\overline{G}$ is defined by the weighted sum of squared distances defined as $\sum_{i<j}^{n} \overline{W}_{ij} \|x_i - x_j\|^2 = Tr(X\overline{L}X^T)$, wherein $x_i$ is the i-th column of X and $x_j$ is j-th column of X;
$F^{(1)}(V, X)$ defines an objective of NMF (nonnegative matrix factorization), wherein as $F^{(1)}(V,X) = \|U - VX\|_F^2$;
$F^{(2)}(X)$ defines an objective of graph embedding, where $$F^{(2)}(X) = \frac{Tr(XLX^T)}{Tr(X\overline{L}X^T)};$$

and
said data processing device applies Pareto optimality to $F^{(1)}(V,X)$ and $F^{(2)}(X)$ , defines the final state V*,X* of matrices V and X at the Pareto optimal resulting from application of said Pareto optimality as a factorization of data matrix U, and classifies said test data according to the classification defined by X*.

18. The system of claim 17, wherein data matrix U is comprised of n samples and each column of U represents a sample.

19. The system of claim 18, wherein each of said samples is an image file.

20. The system of claim 17, wherein said data pairs are class labels of data.

21. The system of claim 17, wherein and each column of feature matrix X is a low dimensional representation of the corresponding column of U.

22. The system of claim 17, wherein the ratio formation of $F^{(2)}(X)$ is handled without any transformation.

23. The system of claim 17, wherein at least one of similarity matrix W or dissimilarity matrix $\overline{W}$ has negative values.

24. The system claim 17, wherein said Pareto optimality is applied directly on said ratio formulation of $F^{(2)}(X)$ in the absence of any weighed sum approximation.

25. The system of claim 17, wherein said Pareto optimality is applied through a series of Pareto improvement status update iterations defined as a change from a current status (V,X) to a new status (V',X') that achieves a Pareto improvement until said Pareto optimal is achieved, and a status update is a Pareto improvement if either of the following two conditions is satisfied:

$$F^{(1)}(V',X') < F^{(1)}(V,X)$$

and $$F^{(2)}(V',X') \leq F^{(2)}(V,X) \quad 1)$$

$$F^{(1)}(V',X') \leq F^{(1)}(V,X)$$

and $$F^{(2)}(V',X') < F^{(2)}(V,X) \quad 2)$$

and wherein
a current status is a Pareto optimal (V*,X*) if there is no other status (V',X') such that a status update iteration from (V*,X*) to (V',X') is a Pareto improvement.

26. The system of claim 17, wherein said Pareto optimality is applied to $F^{(1)}(V,X)$ and to $F^{(2)}(X)$ through iteratively multiplicative updates until said Pareto optimal is achieved; and
letting $\lambda = F^{(2)}(X)$;

$$T_{ij}^{(1)} = \frac{(V^T U)_{ij}}{(V^T V X)_{ij}};$$

letting $$T_{ij}^{(2)} = \frac{(X(L-\lambda \overline{L})^-)_{ij}}{(X(L-\lambda \overline{L})^+)_{ij}}$$

letting
letting matrix $(L-\lambda \overline{L})^+$ be defined as $(L-\lambda \overline{L})^+ = A^+ = [A_{ij}^+]$ and $$A_{ij}^+ = \begin{cases} A_{ij} & \text{if } A_{ij} > 0 \\ 0 & \text{otherwise;} \end{cases}$$

letting matrix $(L-\lambda \overline{L})^-$ be defined as $(L-\lambda \overline{L})^- = A^- = [A_{ij}^-]$ and $$A_{ij}^- = \begin{cases} -A_{ij} & \text{if } A_{ij} < 0 \\ 0 & \text{otherwise;} \end{cases}$$

and said multiplicative updates are defined as:

$$V_{ij} \leftarrow V_{ij} \frac{(UX^T)_{ij}}{(VXX^T)_{ij}}$$

$$X_{ij} \leftarrow X_{ij} \cdot h(T_{ij}^{(1)}, T_{ij}^{(2)})$$

where $$h(a,b) = \begin{cases} \min(a,b) & \text{if } a > 1 \text{ and } b > 1 \\ \max(a,b) & \text{if } a < 1 \text{ and } b < 1 \\ 1 & \text{otherwise.} \end{cases}$$

27. The system of claim 26, wherein said Pareto optimal is achieved when said multiplicative updates reach a stationary point.

28. The system of claim 17, wherein:
similarity matrix $W = [W_{ij}]$ is defined as:

$$W_{ij} = \begin{cases} \frac{1}{n_c} & \text{if } y_i, y_j \in c \\ 0 & \text{otherwise} \end{cases}$$

wherein $y_i$ is a class label of the i-th sample and $n_c$ is the size of class c; and
dissimilarity matrix $\overline{W} = [\overline{W}_{ij}]$ is defined as $$\overline{W}_{ij} = \frac{1}{n} - W_{ij}$$

wherein n is the total number of data points.

* * * * *